3,196,510
EYE SPLICE FITTING
William D. M. Boyd and Lovick P. Young, Vancouver, British Columbia, Canada, assignors to A. I. Steel and Iron Foundry Ltd., Vancouver, British Columbia, Canada
Filed May 27, 1963, Ser. No. 283,387
2 Claims. (Cl. 24—126)

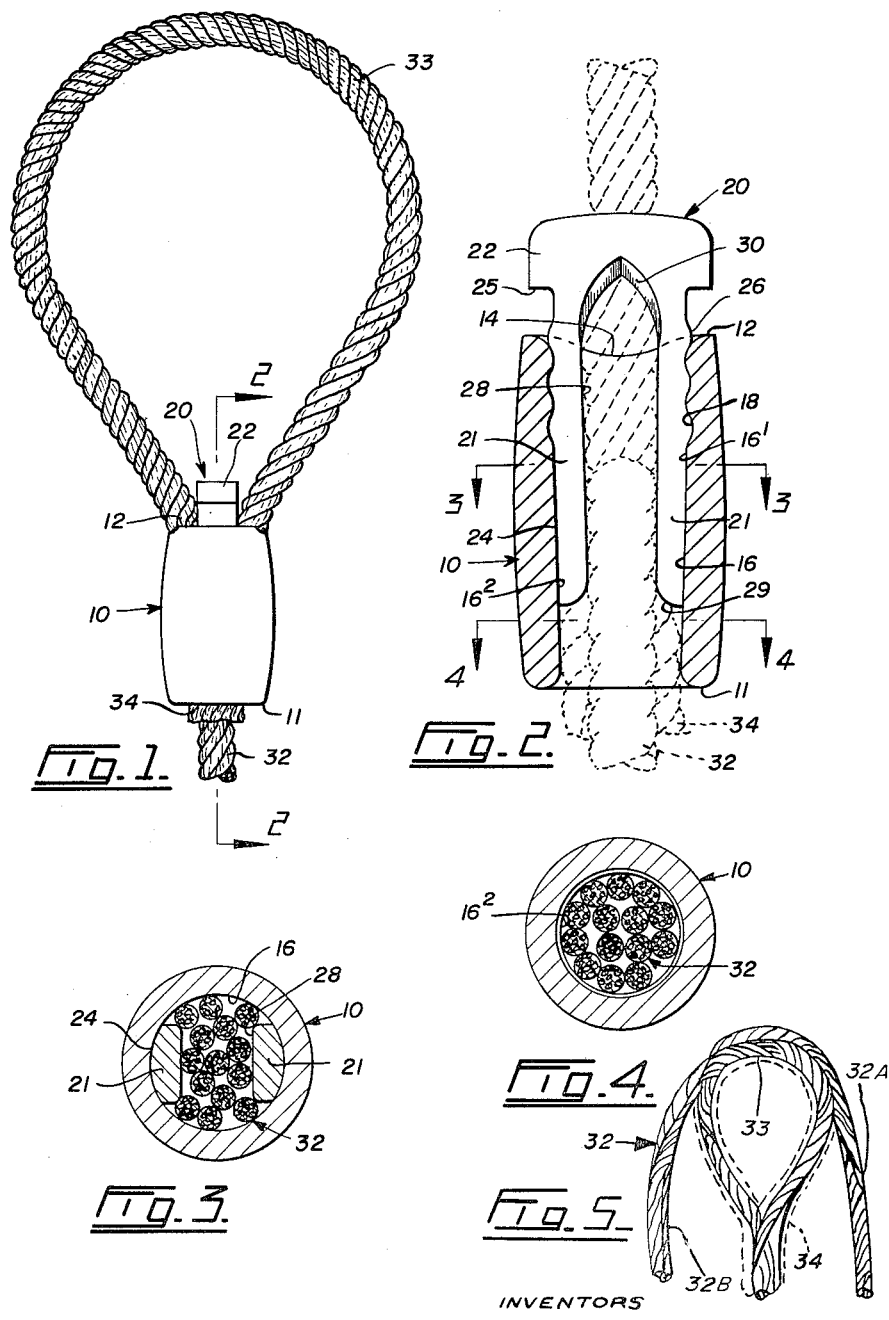

Our invention relates to a fitting which is designed to clamp one cable part to another and which is particularly intended for use in the formation of an eye on a cable end.

The objects of the invention are to provide a simple, inexpensive and extremely effective clamping member which will ensure that the breaking strength of the eye is at least as great as the remainder of the cable.

A further object is to provide means for locking the fitting parts together which will prevent the parts from accidentally separating during use but which will enable the device to be dismantled by a workman employing a few simple tools.

Still further objects are to provide means for locking the fitting parts against movement endwise of the cable which movement might tend to reduce the clamping force applied to the cable and to provide a fitting which will not damage and weaken the cable.

Referring to the drawing:

FIGURE 1 is a side elevation of the invention attached to a cable eye.

FIGURE 2 is an enlarged vertical section take on the line 2—2 of FIG. 1.

FIGURES 3 and 4 respectively are transverse sections taken on the lines 3—3 and 4—4 of FIG. 2.

FIGURE 5 is a reduced scale side elevation showing the partly formed cable eye.

The numeral 10 indicates a sleeve having an outer periphery which is barrel-shaped or outwardly curved so as to be reduced in diameter from the center to the ends of said sleeve. The elongated sleeve may be a heavy metal casting having a lower end which is suitably rounded as at 11. The upper end 12 of the sleeve is internally radiused and is provided with a pair of opposing and semi-circular recesses 14, see FIGURE 2 only. This figure also shows that the bore 16 of the sleeve has a portion $16^1$ which is substantially cylindrical and extends from the end 12 to a point approximately midway between the sleeve ends. Adjacent the upper end of the sleeve, the portion $16^1$ is provided with a number of spaced parallel grooves 18 which grooves are defined by rounded roots and crests merging into the internal radius of the upper end 12. The remainder of the sleeve bore is made up of a portion $16^2$ which tapers inwardly, to a very slight extent, from the above mentioned mid-point to the rounded lower end 11.

The sleeve 10 is adapted to be fitted with a forked retainer generally indicated by the numeral 20 and consisting of widely spaced and substantially parallel legs 21 which are connected at their upper ends by a head 22. This retainer member is a suitable metal forging or casting having a slight resilience which will permit limited deflection of the elongated legs 21 towards the longitudinal axis of the retainer. The spaced legs may be rounded on their outer faces 24 to conform to the curvature of the bore 16 and these faces are spaced apart a distance slightly greater than the internal diameter of the portion $16^1$. The head 22 is wider than the bore 16 or in other words projects a short distance laterally beyond the rounded faces 24 to define shoulders 25. Near the shoulders, the faces 24 are provided with a plurality of spaced stops 26, the stops conforming to the shape of the grooves 18. The inner opposing faces 28 of the legs may be substantially plane surfaces and preferably the lower ends of said legs are radiused as at 29. Near the head 22 the legs 21 are rounded as at 30.

The present fitting is adapted for use in forming an eye or a sling on a length of cable 32 which, preferably, is the preformed type viz. the wires and strands are processed prior to being stranded so that they will assume the position they will take up in the finished rope. Assuming the cable is of the type having six strands and a centre core, the sleeve 10 is first slipped over the body portion of the cable end which is then divided into two parts, one part 32A consisting of three strands and the other part 32B of three strands and the core. One of the parts is looped to the left while the other part is loopd to the right and as shown in solid line in FIGURE 5. The two parts are then overlapped and intertwined as shown in dotted line of FIGURE 5 so as to reform the cable. When the cable is of the preformed type, it will be found that the two parts are easily nested with one another and will form a loop or "farmer's" eye 33 having substantially the same cross-sectional diameter as the remainder of the cable. The extreme ends of the two parts are brought into contact with the sides of the cable near the eye and are wrapped around the body portion of said cable so as to form an enlargement 34 having a length which may be slightly greater than the length of the sleeve 10.

The sleeve is moved up the cable and is forced over the enlargement 34 to the position shown best in FIGURE 1. In order to exert a maximum clamping force to the cable, it is important that the sleeve be positioned as close as possible to the centre of the eye. This sleeve positioning is achieved by virtue of the recesses 14 which seat against the outwardly diverging parts of the cable and allow the top edge 12 of the sleeve to be disposed above the top of the enlargement 34.

The retainer 20 is now supported within the eye and is entered into the bore 16 with the legs 21 straddling the body portion of the cable and the free ends of the parts 32A and 32B forming the enlargement 34. It will be found that only the ends 29 of the legs will freely enter the sleeve and some force is required to drive the retainer beyond this point. A hammer is therefore used to tap the head 22 and force the retainer further into the sleeve. As this movement takes place the cable parts are clamped together and cannot be separated from one another as long as this clamping force remains. At the same time the legs 21 are wedged between the cable and the inner peripheral wall of the sleeve and can only be withdrawn from this position if considerable endwise force is applied to the retainer 20 in the direction of the centre of the eye while firmly supporting the sleeve against movement in the same direction.

It has been found that this wedging and clamping action alone is sufficient to prevent release of the eye and also relative movement between the sleeve and the forked retainer during all normal use of the cable. However, as an added safety factor, one or more of the stops 26 are seated in their corresponding grooves 18 when the retainer has been driven fully home. The legs then have to be deflected at least to this extent before they can be pulled from the sleeve.

As the final blows are given to the head 22 to move the retainer to its final resting place within the sleeve, the diverging parts of the cable are gripped between the edges of the recesses 14 and the rounded edges 30 of the legs. At the same time the legs engage and move across part of the portion $16^2$ of the sleeve bore. This tapered portion acts as a cam surface which moves the leg ends towards each other whereby they are caused to bite into the cable. With the ends 29 gripping the cable in this manner, the fitting cannot be moved lengthwise of the cable should the fitting strike an obstruction, for example, when the cable eye is being dragged over the ground or is being drawn over a roller. The barrel-like shape of the outer periphery of the sleeve gives the device the strength required to move over obstructions without suffering damage and also enables it to traverse a fairlead roller or the like without jamming or offering resistance to the cable movement. The fitting is now securely locked to the cable and it will be noted that the cable is relatively undamaged by the fitting, the end 11, recess 14 and radius 30 ensuring that these parts of the device do not cut into the cable.

Should it be necessary to remove the fitting from the cable a tapered drift or similar tool may be used. The tool is inserted between the end 12 of the sleeve and one of the shoulders 25 of the retainer and is struck a series of blows with a hammer to drive the retainer out of the sleeve whereupon said sleeve may be removed from the cable. An alternative method of dismantling and removing the fitting is to simply burn or cut the cable in two, close to the lower end 11 of the sleeve. The sleeve is then supported in a vise or the like and a drift and hammer are used to drive the eye and the retainer out of the end 12 of the sleeve.

What we claim is:

1. In a rope fitting assembly, a multistrand cable having a body portion, and an eye formed at one end of said body portion, said eye including two parts integral with said body portion, each part containing a plurality of strands, said parts being overlapped and intertwined with each other, the free ends of said parts overlapping said body portion adjacent said eye, a fitting comprising an elongated sleeve surrounding said body portion and free ends of said parts, a retaining member having a pair of elongated spaced resilient legs and a head connecting the legs at one end thereof, said head being greater in width than the diameter of the bore of the sleeve, the distance between the outer surfaces of said legs being slightly larger than a portion of said sleeve, said retaining member being forced into the sleeve with the head disposed within the cable eye and the spaced legs straddling said body portion and the free ends of said parts, said legs being wedged by said portion of the sleeve into clamping engagement with said body portion and free ends of said parts to prevent relative movement threof.

2. In a rope fitting assembly as recited in claim 1, wherein the walls of the bore of the sleeve has a portion provided with a plurality of spaced parallel grooves and said legs having corresponding stops on their outer surfaces adapted to seat in the grooves and lock the retainer against accidental withdrawal from the sleeve.

References Cited by the Examiner

UNITED STATES PATENTS

| 760,332 | 5/04 | Grellner | 306—33 |
| 2,234,028 | 3/41 | Turzicky | 24—126.3 |
| 2,539,719 | 6/51 | Bassett | 306—33 |
| 3,118,273 | 1/64 | Lucht | 57—142 |

FOREIGN PATENTS 952   1889   Great Britain.

DONLEY J. STOCKING, *Primary Examiner.*

BOBBY R. GAY, *Examiner.*